US008883663B2

(12) United States Patent
Beall et al.

(10) Patent No.: US 8,883,663 B2
(45) Date of Patent: Nov. 11, 2014

(54) FUSION FORMED AND ION EXCHANGED GLASS-CERAMICS

(75) Inventors: George Halsey Beall, Big Flats, NY (US); Nicholas Francis Borrelli, Elmira, NY (US); Charlene Marie Smith, Corning, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/306,385

(22) Filed: Nov. 29, 2011

(65) Prior Publication Data

US 2012/0135848 A1    May 31, 2012

Related U.S. Application Data

(60) Provisional application No. 61/418,097, filed on Nov. 30, 2010.

(51) Int. Cl.
| | | |
|---|---|---|
| C03C 10/04 | (2006.01) | |
| C03C 10/12 | (2006.01) | |
| C03B 27/03 | (2006.01) | |
| C03C 10/00 | (2006.01) | |
| C03C 21/00 | (2006.01) | |

(52) U.S. Cl.
CPC ......... *C03C 10/0054* (2013.01); *C03C 10/0045* (2013.01); *C03C 21/002* (2013.01); *C03C 10/0027* (2013.01)
USPC ........................ 501/4; 501/5; 501/7; 428/410

(58) Field of Classification Search
USPC ...................................... 501/4, 7, 5; 428/410
See application file for complete search history.

(56) References Cited

U.S. PATENT DOCUMENTS

| | | | |
|---|---|---|---|
| 3,282,770 A | | 11/1966 | Stookey et al. |
| 3,410,673 A | | 11/1968 | Marusak |
| 3,573,077 A | * | 3/1971 | Beall et al. ..................... 428/410 |
| 3,583,858 A | * | 6/1971 | Bartholomew .............. 65/30.14 |
| 3,812,689 A | | 5/1974 | Reade |
| 3,834,981 A | | 9/1974 | Grossman et al. |
| 3,907,577 A | * | 9/1975 | Kiefer et al. ..................... 501/4 |
| 4,033,775 A | | 7/1977 | Grossman |
| 4,042,403 A | | 8/1977 | Reade |
| 4,059,454 A | | 11/1977 | Reade |
| 4,074,993 A | | 2/1978 | Ackerman et al. |

(Continued)

FOREIGN PATENT DOCUMENTS

| | | |
|---|---|---|
| FR | 2132269 | 11/1972 |
| JP | 11100230 | * 4/1999 |

OTHER PUBLICATIONS

PCT/US2011/062515 Search Report, May 31, 2012.

*Primary Examiner* — Karl Group
(74) *Attorney, Agent, or Firm* — Robert P. Santandrea

(57) ABSTRACT

The present disclosure relates to fusion formable highly crystalline glass-ceramic articles whose composition lies within the $SiO_2$—$R_2O_3$—$Li_2O/Na_2O$—$TiO_2$ system and which contain a silicate crystalline phase comprised of lithium aluminosilicate (β-spodumene and/or β-quartz solid solution) lithium metasilicate and/or lithium disilicate. Additionally, these silicate-crystal containing glass-ceramics can exhibit varying $Na_2O$ to $Li_2O$ molar ratio extending from the surface to the bulk of the glass article, particularly a decreasing $Li_2O$ concentration and an increasing $Na_2O$ concentration from surface to bulk. According to a second embodiment, disclosed herein is a method for forming a silicate crystalline phase-containing glass ceramic.

8 Claims, 2 Drawing Sheets

(56) References Cited

U.S. PATENT DOCUMENTS

| | | | |
|---|---|---|---|
| 4,119,760 A | 10/1978 | Rinehart | |
| 4,148,661 A | 4/1979 | Kerko et al. | |
| 4,507,392 A * | 3/1985 | Rittler | 501/4 |
| 4,755,488 A | 7/1988 | Nagashima | |
| 4,814,297 A | 3/1989 | Beall et al. | |
| 5,580,363 A * | 12/1996 | Goto et al. | 65/29.18 |
| 5,691,256 A * | 11/1997 | Taguchi et al. | 501/63 |
| 6,383,645 B1 * | 5/2002 | Goto et al. | 428/426 |
| 6,436,859 B1 | 8/2002 | Muramoto et al. | |
| 6,677,046 B2 * | 1/2004 | Hachitani et al. | 428/426 |
| 7,157,149 B2 | 1/2007 | Belykh et al. | |
| 7,262,144 B2 * | 8/2007 | Schreder et al. | 501/66 |
| 7,666,511 B2 | 2/2010 | Ellison et al. | |
| 7,727,917 B2 * | 6/2010 | Shelestak et al. | 501/69 |
| 8,043,706 B2 * | 10/2011 | Goto et al. | 428/426 |
| 8,114,795 B2 * | 2/2012 | Yagi et al. | 501/5 |
| 8,257,831 B2 * | 9/2012 | Yagi | 428/426 |
| 8,664,130 B2 * | 3/2014 | Beall et al. | 501/7 |
| 8,664,131 B2 * | 3/2014 | Beall et al. | 501/7 |
| 2005/0090377 A1 | 4/2005 | Shelestak et al. | |
| 2009/0162608 A1 | 6/2009 | Yagi et al. | |
| 2010/0224619 A1 | 9/2010 | Schoenberger et al. | |
| 2011/0092353 A1 * | 4/2011 | Amin et al. | 501/3 |

* cited by examiner

US 8,883,663 B2

FUSION FORMED AND ION EXCHANGED GLASS-CERAMICS

This application claims the benefit of priority under 35 U.S.C. §119 of U.S. Provisional Application Ser. No. 61/418,097 filed on Nov. 30, 2010 the content of which is relied upon and incorporated herein by reference in its entirety.

TECHNICAL FIELD

The present disclosure herein relates generally to glass-ceramics, in particular to fusion formed and ion exchanged lithium aluminosilicate glass-ceramic glass article comprising β-spodumene and/or β-quartz solid solution.

BACKGROUND

Glass-ceramics are polycrystalline materials formed by a controlled crystallization of a precursor glass. In general, the method for producing such glass-ceramics customarily involves three fundamental steps: first, melting a glass-forming batch containing the selected metallic oxides; second, cooling the melt to a temperature at least below its transformation range, while simultaneously forming a glass body of a desired geometry; and third, heating the glass body to a temperature above the transformation range of the glass in a controlled manner to generate crystals in situ. To develop nuclei in the glass, the glass will be heated initially to a temperature within or somewhat above the transformation range for a period of time; although there are certain compositions that are known to be self-nucleating and thus do not require the development of nuclei. Thereafter, the temperature will be raised to temperatures where crystals can grow from the nuclei. The resulting crystals are typically uniformly distributed and fine-grained. Internal nucleation permits glass-ceramics to have favorable qualities such as a very narrow distribution of particle size and a highly uniform dispersion of crystals throughout the glass host.

Glass-ceramics have not been formed by the fusion process because this process requires a much higher viscosity at the liquidus than that available in the precursor glasses of glass-ceramics. Depending upon particular compositions and the forming parameters implemented, the fusion process requires viscosities at the liquidus of at least 75,000 poise, in some cases, of well over 100,000 poises, and more typically above 500,000 poises. The parent glasses of glass-ceramics, designed to crystallize easily, typically have viscosities at their liquidi of 10,000 poises or below, and to our knowledge never above 20,000 poises. They therefore are not amenable to fusion forming. This presents a problem and an opportunity, because glass-ceramics offer desirable properties not achievable in fusion formable glasses. These properties include opacity, various degrees of translucency and surface luster, pastel colors, and perhaps most importantly, a low or essentially zero coefficient of thermal expansion. Thus glass-ceramics have a wider variety of aesthetic appearances as well as heat and fire resistance. Moreover, glass-ceramics are generally stronger than glass, and through surface ion exchange processing can often be made stronger than ion-exchanged glass because of lower stress relaxation at salt-bath temperatures.

Down draw processing of glass, particularly the fusion processing of glass exhibits the inherent advantages of the formation of a resultant pristine surface and the ability to product glass articles (e.g., sheets) exhibiting thinness dimension on the order to 2 mm or less.

As such, it would be desirable to identify glass-ceramics which can be made from fusion formed glasses thus resulting in the formation of thin glass-ceramic articles exhibiting pristine surfaces and exhibiting the intrinsic benefits of glass-ceramics (when compared to glasses), namely strength, low CTE, and associated thermal shock resistance, and color/opacity variation.

SUMMARY

Disclosed herein are fusion formable highly crystalline glass-ceramic articles whose composition lies within the $SiO_2$—$R_2O_3$—$Li_2O/Na_2O$—$TiO_2$ system and which contain a silicate crystalline phase comprised of lithium aluminosilicate, specifically β-spodumene and/or β-quartz solid solution, as well as, lithium metasilicate and/or lithium disilicate. Additionally, these silicate glass-ceramics can exhibit varying $Na_2O$ to $Li_2O$ molar ratio extending from the surface to the bulk of the glass article, particularly a decreasing $Li_2O$ concentration and an increasing $Na_2O$ concentration from surface to center.

In one embodiment these translucent or opaque silicate crystal-containing glass-ceramics comprise, in weight percent on an oxide basis, of 40-80% $SiO_2$, 2-30% $Al_2O_3$, 2-10% $Li_2O$, 0-8% $TiO_2$, 0-3% $ZrO_2$, 0-2% $SnO_2$, 0-7% $B_2O_3$, 0-4% MgO, 0-12% ZnO, 0-8% BaO, 0-3% CaO, 0-6% SrO, 0-4% $K_2O$, up to 2% $Na_2O$, 0-1.0% $Sb_2O_3$, 0-0.25% Ag, 0-0.25 $CeO_2$, the molar ratio of $Li_2O+Na_2O/Al_2O_3+B_2O_3$ of greater than 0.8, and the combination of $TiO_2+ZrO_2+SnO_2$ in an amount of at least 3.0 wt %.

According to a second embodiment, disclosed herein is a method for forming a silicate crystal-containing glass ceramic which comprises the following steps: (a.) melting a batch for, and down drawing a glass article having a composition comprising, in weight percent on an oxide basis, of 40-80% $SiO_2$, 2-30% $Al_2O_3$, 5-30% $Na_2O$, 0-8 $TiO_2$, 0-12 $ZrO_2$, 0-2% $SnO_2$, 0-7% $B_2O_3$, 0-4% MgO, 0-6% ZnO, 0-8% BaO, 0-3% CaO 0-3, 0-6% SrO 0-6, 0-4% $K_2O$, 0-2% $Li_2O$, 0-1.0% $Sb_2O_3$, 0-0.25% Ag, 0-0.25 $CeO_2$, the molar ratio of $Na_2O/Al_2O_3+B_2O_3$ of greater than 0.8, and the combination of $TiO_2+ZrO_2+SnO_2$ in an amount of at least 3.0 wt %; (b.) ion exchanging the glass article by placing the glass article in a Li-containing salt bath exhibiting a temperature sufficiently above the glass strain point and holding the glass sheet for time sufficient to complete ion exchange of Li for Na ions substantially throughout the glass article; (c.) ceramming the glass to a temperature between about 550-1100° C. for a period of time sufficient to cause the generation of a glass-ceramic which contains a predominant silicate crystal phase of lithium aluminosilicate (β-spodumene and/or β-quartz solid solution), lithium metasilicate and/or lithium disilicate phase and exhibits a glass-ceramic composition within the $SiO_2$—$R_2O_3$—$Li_2O/Na_2O$—$TiO_2$ system; and, (d.) cooling the glass-ceramic article to room temperature.

In a further embodiment the ion-exchanging and the ceramming steps for the glass article can be accomplished simultaneously and are performed in the Li-containing salt bath exhibiting a temperature sufficiently above the glass strain point.

Additional features and advantages of the embodiments described herein will be set forth in the detailed description which follows, and in part, will be readily apparent from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
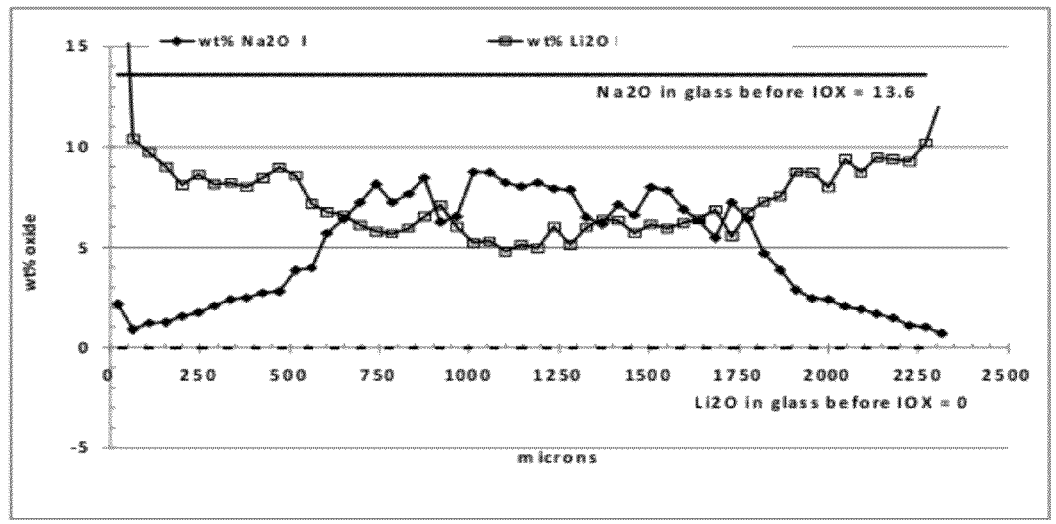
FIG. 1 is a plot illustrating the respective $Li_2O$ and $Na_2O$ surface-to-depth concentrations of an illustrative embodiment disclosed herein wherein the glass/glass-ceramic article has been IOX'd to produce an alkali gradient.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween.

The present disclosure is based on the discovery of a family of fusion formable glass compositions that can produce glasses of excellent stability which can be ion exchanged (whereby Li replaces some portion of the Na ions) and thereafter cerammed to produce substantially translucent or opaque glass-ceramics having silicate as the predominant crystal phase with that silicate crystal phase being a lithium aluminosilicate phase (β-spodumene and/or β-quartz solid solution phase), a lithium disilicate and/or lithium metasilicate crystal phase.

The current disclosure addresses the currently recognized inability to fusion draw glass-ceramic articles due to the typical low viscosities associated with precursor glasses used to form glass ceramics; i.e., the liquidus viscosities typically exhibited by precursor glasses for glass ceramics are in the 10,000-20,000 poises range which is far below the minimum 75,000 poise required for certain down-draw processes such as some fusion processes. In other words, inherently glasses which can readily be crystallized to form glass-ceramics have typically have low a relatively viscosity at the liquidus, generally less than the aforementioned 10,000-20,000 poise and thus do not lend themselves to fusion drawability which requires the viscosity of the liquidus to be at least higher than around 75,000 poise, depending upon the composition and the forming conditions utilized. Generally, the inventors have essentially solved this low liquidus viscosity problem exhibited by glass ceramic precursor glasses by fusion-forming a glass composition with high viscosity at the liquidus and subsequently converting this glass, by high temperature Li for the Na ion exchange (complete or nearly complete ion exchange) at a temperature well above the strain point, to a glass corresponding to the original precursor glass composition for the desired glass-ceramic. This new glass, with most, if not all of the Na replaced by Li, can then be converted to the requisite glass-ceramic by standard heat treatment processing which achieves crystallization and the formation of the glass-ceramic.

Recognition and solution of the aforementioned problem has resulted in the discovery of fusion formable highly crystalline glass-ceramic articles whose composition lies within the $SiO_2$—$R_2O_3$—$Li_2O/Na_2O$—$TiO_2$ system. These glass ceramic materials contain a silicate crystalline phase comprised of a lithium aluminosilicate phase (β-spodumene and/or β-quartz solid solution), lithium disilicate and/or lithium metasilicate crystal phase.

Disclosed herein is a substantially translucent or opaque, lithium aluminosilicate, disilicate, or metasilicate crystal-containing glass-ceramics which exhibits a base composition comprising, in weight percent on the oxide basis, of the constituents listed in Table I:

TABLE I

| | |
|---|---|
| $SiO_2$ | 40-80% |
| $Li_2O$ | 2-10% |
| $ZrO_2$, | 0-3 |
| $B_2O_3$ | 0-7% |
| ZnO | 0-12% |
| CaO | 0-3% |
| $K_2O$ | 0-4% |
| Ag2O | 0-0.1% |
| Au | 0-0.01% |
| $Li_2O + Na_2O/Al_2O_3 + B_2O_3$ | ≥0.8 |
| $Al_2O_3$ | 2-30% |
| $TiO_2$ | 0-8 |
| $SnO_2$ | 0-2% |
| MgO | 0-7% |
| BaO, | 0-8% |
| SrO | 0-6% |
| $CeO_2$ | 0-0.02 |
| $Na_2O$ | up to 3% |
| $Sb_2O_3$ | 0-1.0% |

Additionally, these silicate crystal containing glass-ceramics can exhibit varying $Na_2O$ to $Li_2O$ molar ratio, or molar ratio gradient, extending from the surface into the bulk of the glass article. In particular, this molar ratio variation is exhibited as high $Li_2O$ concentration on the surface which decreases into the bulk and low $Na_2O$ concentration exhibited on the surface which increases into the surface. Furthermore, this $Li_2O$ to $Na_2O$ gradient (surface to bulk) results in a higher level of Li-crystallinity being exhibited on the surface, and thus lower expansion when compared the bulk which exhibits a lowered level of Li-crystallinity (higher Na-crystallinity) and higher associated expansion; i.e., since the Li-aluminosilicate crystals have lower thermal expansion when compared to the Na-aluminosilicate crystals it follows that the surface would exhibit a lower thermal expansion. This difference in expansion or expansion mismatch (low on the surface and higher in the bulk) results in a silicate-crystal containing glass-ceramic which exhibits the added benefit/attribute of some level of compression on the surface and thus a glass-ceramic article which inherently exhibits added strength a surface which is more damage and scratch resistant.

Colorants in the form of metallic ions may be present in order to impart various colors or tints to the glass. Specifically, those metallic ions which can achieve this colorant feature include those transition metal ions selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, and $Ta^{5+}$.

Maintaining an $Li_2O+Na_2O/Al_2O_3+B_2O_3$ molar ratio of greater than 0.8 is necessary to avoid the formation of high liquidus phases such as mullite and to result in the production of desired silicate crystal phases such as, but not limited to, lithium aluminosilicate (β-spodumene and/or β-quartz solid solution), lithium metasilicate and/or lithium disilicate.

It should be noted that in certain embodiments, particularly those lithium aluminosilicate (β-spodumene and/or β-quartz solid solution) containing glass-ceramics, a further compositional requirement of $TiO_2+ZrO_2+SnO_2$ amounts in excess 3.0 wt % is required in the composition and functions as a nucleation package. In other words, this total amount of nucleating agents are required in the glass-ceramic (precursor glass composition) so that effective nucleation is initiated and the necessary crystal growth is achieved. Although it should be noted that $TiO_2$ amounts exceeding 4.5% should be avoided due to the resultant high rutile liquidus which has the potential to increase problems in the initial fusion forming of the glass.

According to another embodiment the base glass-ceramic composition comprises, in weight percent on the oxide basis, of the following constituents: 55-70% $SiO_2$, 17-23% $Al_2O_3$, 0-5% $B_2O_3$, 2.5-7% $Li_2O$, 0-3% $ZrO_2$, 0-1% $SnO_2$, 0-3% $MgO$, 0-6% $ZnO$, 0-4% $Na_2O$, and 2-4.5% $TiO_2$.

In another embodiment, particularly those glass ceramics where the silicate crystal phase comprises either lithium metasilicate and/or lithium disilicate, one representative base glass-ceramic composition comprises, in weight percent, 74-81% $SiO_2$, 4.5-10% $Al_2O_3$, 8.8-10.1% $Li_2O$, greater than zero to less than 0.3% $CeO_2$, 1.5-1.7% $ZnO$, 1.2-1.6% $Na_2O$, 2.2-3.8% $K_2O$, >0 to 0.25% $Sb_2O_3$, less than 0.1% $SnO_2$, and from greater than zero up to 0.3% of at least one metal selected from the group of gold (Au) and silver (Ag), or mixtures thereof, provided that the sum of Au+Ag is not greater than 0.3%.

The following disclosure relates to a method for forming a lithium aluminosilicate, disilicate and/or metasilicate glass ceramics. In its most general form the method comprises the following steps: (a.) melting a batch for, and down drawing a glass article having a composition comprising, in weight percent on an oxide basis, of 40-80% $SiO_2$, 2-30% $Al_2O_3$, 5-30% $Na_2O$, 0-8% $TiO_2$, 0-3% $ZrO_2$, 0-2% $SnO_2$, 0-7% $B_2O_3$, 0-7% $MgO$, 0-12% $ZnO$, 0-8% $BaO$, 0-3% $CaO$ 0-3, 0-6% $SrO$ 0-6, 0-4% $K_2O$, 0-3% $Li_2O$, 0-1.0% $Sb_2O_3$, 0-0.25% Ag, 0-0.25% $CeO_2$, 0-0.01% Au, a molar ratio of $Li2O+Na_2O/Al_2O_3+B_2O_3$ of greater than 0.8, wherein the batched glass exhibits a liquidus viscosity of greater than 75,000 in the down drawing of the glass article; (b.) ion exchanging the glass article by placing the glass article in a Li-containing salt bath exhibiting a temperature sufficiently above the glass strain point and holding the glass sheet for time sufficient to complete ion exchange of Li for Na ions substantially throughout the glass article; (c.) ceramming the glass to a temperature between about 550-1100° C. for a period of time sufficient to cause the generation of a glass-ceramic which contains a predominant silicate crystal phase of lithium aluminosilicate (β-spodumene and/or β-quartz solid solution), lithium metasilicate and/or lithium disilicate, and exhibits a glass-ceramic composition within the $SiO_2$—$R_2O_3$—$Li_2O/Na_2O$—$TiO_2$ system; and (d.) cooling the glass-ceramic article to room temperature.

In another embodiment the method involves utilizing a batch composition consisting essentially, in weight percent on an oxide basis, of 55-70% $SiO_2$, 17-23% $Al_2O_3$, 0-5% $B_2O_3$, 10-20% $Na_2O$, 0-2% $Li_2O$, 0-3% $ZrO_2$, 0-1% $SnO_2$, 0-2% $MgO$, 0-3% $ZnO$, and 2-4.5% $TiO_2$.

The glass batch composition further include a transition metal ion selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, $Ta^{5+}$.

Inclusion of small amounts of $Li_2O$ in the batch of the precursor glass have the potential to reduce the time necessary to complete ion exchange process due to the fact that less Li for Na ion exchange will be needed to achieve the desired level of Li in the final glass-ceramic. However, it is recommended that no more than 3 wt. % $Li_2O$ (approximately ¼ of final desired glass-ceramic $Li_2O$ amount) be included in the precursor glass batch. $Li_2O$ levels exceeding 2 wt. % result in rapid crystallization conditions which tend to produce a higher liquidus due to the formation of a β-spodumene phase, which detrimentally effects the ability to down draw (fusion form) glass articles.

Regarding the down draw process it is contemplated that this includes either a fusion draw glass process or a slot draw process.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

As used herein, the term "ion-exchanged" is understood to mean treating the heated aluminosilicate precursor glass with a heated solution containing ions having a different ionic radius than ions that are present in the glass surface and/or bulk, thus replacing those ions with smaller ions with the larger ions or vice versa depending on the ion exchange temperature conditions. Potassium ions, for example, could either replace, or be replaced by, sodium ions in the glass, again depending upon the ion exchange temperature conditions. Alternatively, other alkali metal ions having larger atomic radii, such as rubidium or cesium could replace smaller alkali metal ions in the glass. Similarly, other alkali metal salts such as, but not limited to, sulfates, halides, and the like may be used in the ion exchange process.

In the instant method, it is contemplated that both types of ion exchange can take place; i.e., larger for smaller ions are replaced and smaller for larger ions are replaced. In one embodiment, the method involves ion exchanging the glass article by placing the glass article in a Li-containing salt bath, exhibiting a temperature sufficiently above the glass strain point, and holding the glass sheet for time sufficient to complete ion exchange of Li for Na ions substantially throughout the glass article. In some embodiments this IOX process takes place at temperatures above 500° C., particularly for those precursor glasses where the crystal phase comprises lithium disilicate and/or lithium metasilicate. In other embodiments the IOX process takes place above 700° C., particularly for those precursor glasses where the crystal phase comprises lithium aluminosilicate (β-spodumene and/or β-quartz solid solution). In certain embodiments (lithium aluminosilicate) the molten salt bath is a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. Alternatively, in those lithium disilicate and/or lithium metasilicate embodiments, the baths may be comprised of pure $LiNO_3$ as the major exchange salt. This ion-exchange step functions to replace the larger sodium ions in the glass structure with the smaller lithium ions which are found in the Li-containing salt bath. Regardless of the embodiment, the precursor Na-containing glass which has been fusion drawn is transformed into precursor Li-containing glass which can be cerammed to produce a glass-ceramic having a predominant silicate crystal phase, either a lithium aluminosilicate crystal phase (β-spodumene and/or β-quartz solid solution) or alternatively a phase comprising either lithium-metasilicate or lithium disilicate. It should be noted that this ion exchange is accomplished a temperature sufficiently above the glass strain point so as to relieve any tension which would be created in the glass article as a result of the replacing of a larger Na ions with smaller Li ions and thus avoiding the creation any undesired microcracking.

It is contemplated that the aforementioned varying of $Na_2O$ to $Li_2O$ molar ratio, or molar ratio gradient, extending from the surface into the bulk of the glass article can be controlled or achieved through the IOX process conditions utilized. Longer IOX process times or higher IOX temperatures are necessary for achieving complete IOX where all of the Na is exchanged for the Li; i.e., no gradient and a flat alkali profile. One skilled in the art will be able to determine the time and temperature necessary to achieve the gradient or non gradient alkali profiles.

In a further embodiment the ion-exchanging and the ceramming steps for the glass article can be accomplished simultaneously and can be performed in the Li-containing salt bath exhibiting a temperature sufficiently above the glass strain point. In order to achieve simultaneous ion-exchange and ceramming it is recommended that bath temperatures exceeding 800° C. be utilized. As described above for the ion-exchange alone step, the molten salt bath is a high temperature sulfate salt bath composed of $Li_2SO_4$ as a major ingredient, but diluted with $Na_2SO_4$, $K_2SO_4$ or $Cs_2SO_4$ in sufficient concentration to create a molten bath.

The advantages of this combined ion-exchanging/ceramming technique over the process where ceramming is subsequent to the ion-exchange step include: (1) allowing the glass to relax sufficiently in the bath so that tensile stresses from Li+ for Na+ exchange are dissipated, (2) reduced handling of the glass/glass-ceramic article and thus reduced opportunities for damaging the glass/glass-ceramic articles, and in turn reduced costs; (3) ceramming thin articles like sheet in a salt bath where the effective weight of the glass is greatly reduced by buoyancy, allows maintenance of a pristine surface, especially in comparison to normal atmosphere ceramming where contact with a substrate can blemish the surface of the article. It should be noted that one additional benefit of the combined step is that higher salt bath temperatures which achieve the ceramming to form the glass-ceramic are lower than those temperatures required in normal atmosphere ceramming of the same type of glass.

In a still further embodiment the so-formed glass ceramic article can be subject a post-ceramming ion-exchange process. In this second ion-exchange step the glass-ceramic article is placed, after ceramming, in a second Na-containing ion-exchange bath at a temperature below the glass strain point. The glass-ceramic is held in the ion exchange bath for a sufficient time for ion exchange to occur on the surface and into some depth into the article. Particularly the second ion-exchange process results in the exchange small Li for large Na ions thus creating a compressive surface layer. In other words, surface compressive stress is created to a stress caused by the substitution during chemical strengthening of an alkali metal ion contained in a glass surface layer by an alkali metal ion having a larger ionic radius. In this embodiment, the down-drawn glass is chemically strengthened by placing it a molten salt bath comprising $NaNO_3$ for a predetermined time period to achieve ion exchange. In one embodiment, the temperature of the molten salt bath is about 430° C. and the predetermined time period is about eight hours.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (CT) of the glass. The compressive stress is related to the central tension by the following relationship:

$$CS=CT \times (t-2DOL)/DOL;$$

where t is the thickness of the glass and DOL is the depth of exchange.

EXAMPLES

The following examples illustrate the advantages and features of the invention and in are no way intended to limit the invention thereto:

Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions.

Example 1

In a first example, a precursor glass from the basic $SiO_2$—$Al_2O_3$—$Na_2O$ system and which was capable of being down-drawn (particularly fusion formed) into a glass article/sheet was formed. Specifically, a simple sodium aluminosilicate glass with the following batched composition, in weight percent, was produced: 56.6% $SiO_2$, 24.0% $Al_2O_3$, 14.6% $Na_2O$ and 4.8% $TiO_2$; Titania was present at levels required for eventual nucleation. This glass was batched, mixed and melted in a platinum crucible at 1650° C. and thereafter annealed at 650° C. It was expected that glass would yield a low expansion lithium aluminosilicate glass-ceramic after Li+ for Na+ exchange and subsequent heat treatment.

Glass squares about 1" in size were ground and polished to 1-2 mm thickness to simulate fusion formed glass. These squares were placed in a 73 wt. % $Li_2SO_4$, 27% $K_2SO_4$ (close to eutectic composition) salt bath at 700° C. for roughly 2.8 hours to enable complete or nearly complete Li+ for Na+ ion exchange. The squares were cooled and rinsed with water. One crack was observed, but the square remained transparent. Little to no evidence of stress was seen in a polarimeter.

About one half of the square was then placed in a furnace and heat treated for 2 hours at 780° C. for nucleation and 4 hours at 900° C. for crystal growth. The result was a translucent highly crystalline glass-ceramic whose composition was identified by x-ray diffraction (XRD) analysis as containing, a lithium aluminosilicate crystalline phase, particularly, a β-spodumene solid solution phase, with a minor phase of aluminum titanate ($Al_2TiO_5$) being present.

Example 2

In a second example, a precursor glass from the complex $SiO_2$—$Al_2O_3$—$Na_2O$ system and which was capable of being fusion formed was formed. Specifically, a complex sodium aluminosilicate glass with the following batched composition, in weight percent, was produced: 65.8% $SiO_2$, 19.0% $Al_2O_3$, 7.1% $Na_2O$, 1.1% MgO, 1.6% ZnO, 0.8% BaO, 0.3% $SnO_2$ and 4.3% $TiO_2$. A glass of this composition was subjected to the same glass forming, ion exchanging and ceramming conditions as described for Example 1.

Following the ion exchange process, the glass square was transparent and exhibited no cracks. After heat treatment the translucent glass-ceramic subject to XRD analysis which revealed that the so-produced glass-ceramic was composed predominantly of a lithium aluminosilicate crystalline phase, and particularly a "stuffed" β-quartz solid solution phase, a phase with near-zero coefficient of thermal expansion, and included traces of β-spodumene solid solution and minor glass phase, as well. Further heat treatment at a temperature of 1100° C. produced additional crystallinity resulting in an opaque β-spodumene (also a low CTE phase) glass-ceramic with a similar appearance to CorningWare®.

Example 3

In a third example, a precursor glass from the basic $SiO_2$—$Al_2O_3$—$Na_2O$ system and which was capable of being downdrawn (particularly fusion formed) into a glass article/sheet was formed. Specifically, a simple sodium aluminosilicate glass with the following batched composition, in weight percent, was produced: 58.8% $SiO_2$, 21.5% $Al_2O_3$, 13.6% $Na_2O$, 0.3% $SnO_2$ and 4.3% $TiO_2$. As in example 1, this glass was batched, mixed and melted in a platinum crucible at 1650° C. and thereafter annealed at 650° C.

This glass was cut and polished into 1" squares of ~2 mm thickness and then placed in a molten salt bath of a composition having 75 wt. % $Li_2SO_4$ and 25 wt. % $Na_2SO_4$ and held for two hours at a temperature of 800° C. This time and temperature was sufficient to both allow Li+ for Na+ ion exchange and to allow internal nucleation and crystallization to occur over the whole thickness of the glass; i.e., ion-exchange and ceramming occurred simultaneously in the molten salt bath.

The resultant glass-ceramic article was white glass-ceramic and exhibited a glossy skin. XRD analysis revealed a composition comprised of a lithium aluminosilicate (very low thermal expansion) as the predominant crystalline phase, particularly a β-spodumene phase with minor rutile and glass phases. The fracture surface showed a fine grained crystallized texture throughout the body. The glass-ceramic appeared stronger than average in a hammer break test but broke into large fragments; i.e., the glass-ceramic article was not frangible.

Examples 4-7

Four additional glass-ceramic examples are listed in Table II below; particularly the precursor glass compositions (in weight percent) used to produce the glass-ceramic. These glass-ceramics were produced from precursor glasses, as listed, in the same manner as that described above for Example 3. The precursor glasses were IOX'd and converted into glass-ceramics in a single "IOX and nucleation/crystallization" step similar manner to that described above for Example 3; the actual salt bath utilized for each of these examples was a molten salt bath of a composition comprising 70 wt. % $Li_2SO_4$ and 30 wt. % $Na_2SO_4$, with the actual IOX times listed in Table II. Also listed in Table II is the liquidus temperature and viscosity at liquidus of each of the precursor glass.

In each of the four examples, 4-7, the resultant glass-ceramic article was a white glass-ceramic and XRD analysis revealed a composition comprised of lithium aluminosilicate (very low thermal expansion), particularly a β-spodumene solution phase, with a minor rutile phase being present.

TABLE II

| | 4 | 5 | 6 | 7 |
|---|---|---|---|---|
| $SiO_2$ | 60.4 | 60.2 | 60.7 | 56.5 |
| $B_2O_3$ | 1.5 | 1.5 | 3.5 | 4.5 |
| $Al_2O_3$ | 22.1 | 21.0 | 18.0 | 19.5 |
| $Li_2O$ | 1.5 | 1.5 | 1.0 | 1.1 |
| $Na_2O$ | 10.9 | 11.8 | 12.3 | 13.4 |
| MgO | — | — | 0.5 | 0.5 |
| $TiO_2$ | 2.9 | 2.8 | 2.6 | 2.6 |
| $ZrO_2$ | 0.6 | 1.0 | 1.2 | 1.7 |
| $SnO_2$ | 0.2 | 0.2 | 0.2 | 0.2 |
| Liquidus temp. (° C.) | 1100 | 1050 | 950 | 1060 |
| Viscosity at Liquidus (Poise) | 75,000 | 200,000 | 300,000 | |
| IOX temp./time (° C./Hrs.) | 850/3 | 750/4 | 750/4 | 850/16 |

Examples 8-9

In another example, another precursor glass from the basic $SiO_2$—$Al_2O_3$—$Na_2O$ system and capable of being downdrawn (particularly fusion formed) into a glass article/sheet was formed. Specifically, a simple sodium aluminosilicate glass with the following batched composition, in weight percent, was produced: 59.0% $SiO_2$, 21.6% $Al_2O_3$, 13.6% $Na_2O$, 1.5% $B_2O_3$ and 4.3% $TiO_2$; titania being present at levels required for eventual nucleation. A glass of this composition was subjected to the same glass forming, and ceramming conditions as described for Example 1, with the IOX conditions being varied as described below.

Figure 2:
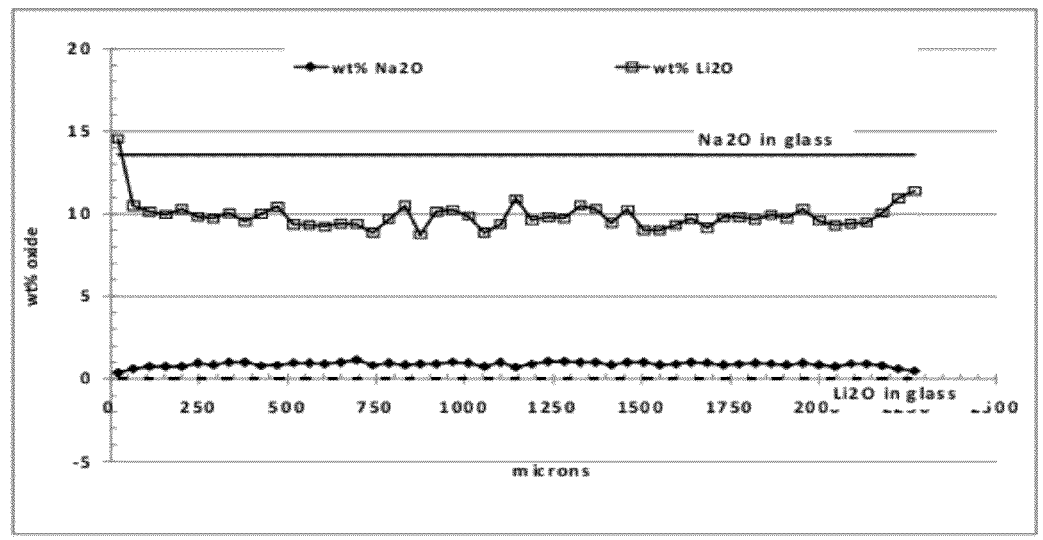
FIG. 2 is a plot illustrating the respective $Li_2O$ and $Na_2O$ surface-to-depth concentrations of an illustrative embodiment disclosed herein wherein the glass/glass-ceramic article has been IOX'd such that substantially all the $Na_2O$ has been replaced by $Li_2O$, thus no alkali gradient.

Glass squares about 1" in size were ground and polished to 1-2 mm thickness to simulate fusion formed glass. These squares were placed in a 70 wt. % $Li_2SO_4$, 30% $K_2SO_4$ (close to eutectic composition) salt bath at 850° C. In one embodiment, Example 8, the glass was IOX'd for a period of roughly 2 hours to achieve a varying $Na_2O$ to $Li_2O$ molar ratio (gradient) while in a second embodiment, Example 9, the glass was IOX'd for a period of 8 hours to enable complete or nearly complete Li+ for Na+ ion exchange or no gradient or a flat alkali profile. In each embodiment the squares were cooled and rinsed with water. FIGS. 1 and 2 illustrates the respective $Li_2O$ and $Na_2O$ surface-to-depth concentrations for the Examples 8 and 9 above. As can be seen in the FIG. 1 plot the so-formed glass/glass-ceramic article exhibits an alkali gradient with the Na varying from about 10% at the surface to about 5% in the bulk, while the $Li_2O$ varies from about 1-2% on the surface to about a maximum of 9% in the bulk. As can be seen in the FIG. 2 plot, the so-formed glass/ glass-ceramic article exhibits an flat alkali profile where the $Na_2O$ is essentially 0% and has been replaced by $Li_2O$ exhibiting a range between about 9-11%.

In both embodiments the result was a translucent highly crystalline glass-ceramic whose composition was identified by x-ray diffraction (XRD) analysis as containing a lithium aluminosilicate crystalline phase, particularly a β-spodumene solid solution phase and minor phase of rutile. Specifically, the glass-ceramic in both embodiments was analayzed to be comprised of the following composition: 63.5% $SiO_2$, 23.2% $Al_2O_3$, 7.1% $Li_2O$, 1.6% $B_2O_3$ and 4.6% $TiO_2$.

Example 10

One final example, involved a utilizing a precursor glass from the $SiO_2$—$Al_2O_3$—$Na_2O$ system, and capable of being down-drawn (particularly fusion formed) into a glass article/sheet; in this example the composition was one from which a lithium metasilicate crystal phase would be produced in the glass-ceramic form. Specifically, a sodium aluminosilicate glass with the following batched composition, in mole percent, was produced: 74.8% $SiO_2$, 2.4% $Al_2O_3$ 19.6% $Na_2O$, 2.5% $K_2O$ 0.67% ZnO, 0.06% Ag and 0.006% Au.

A glass of this composition was subjected to the same glass forming, and ceramming conditions as described for Example 1, with the IOX conditions being varied as described below.

Glass squares about 1" in size were ground and polished to 1-2 mm thickness to simulate fusion formed glass. These squares were placed in a 100% $LiNO_3$ salt bath at 500° C. for a period of 6 hours to enable complete or nearly complete Li+ for Na+ ion exchange. The squares were cooled and rinsed with water.

Figure 3:
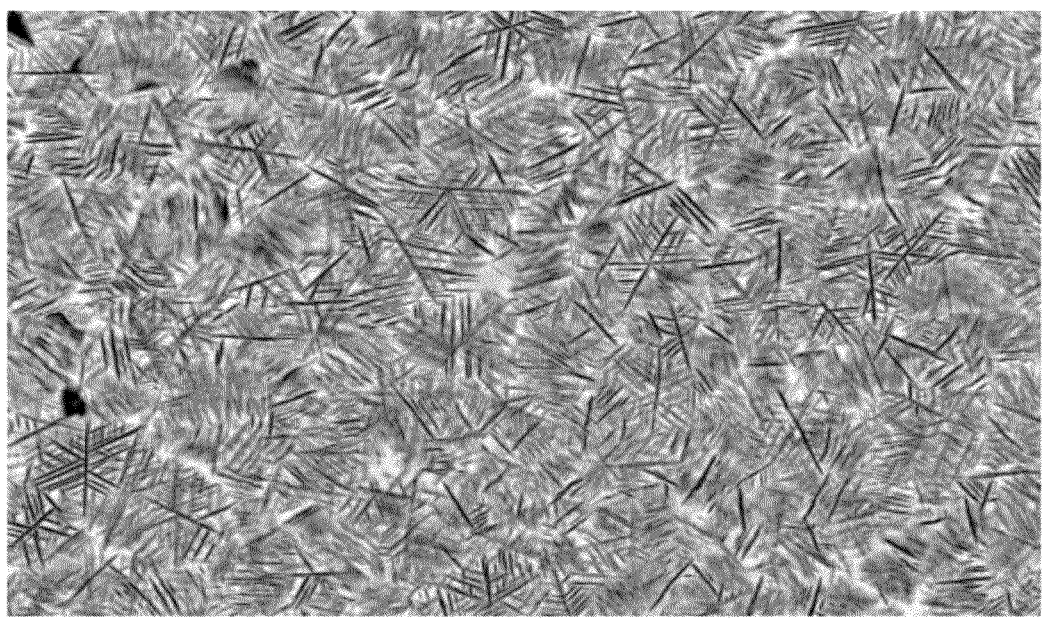
FIG. 3 is an SEM micrograph illustrating the Li-metasilicate crystal structure of an illustrative embodiment disclosed herein.

Prior to heat-treatment the Example 10 sample was exposed to UV light for a period for 4 min, to produce precursor silver nuclei. Then, as in the previous embodiments the sample was then placed in a furnace and heat treated in the following manner to achieve nucleation and crystal growth; 3-4° C./min. ramp to approximately 550° C. followed by an approximate ½ hold, approximately 2° C./min ramp to 600° C. followed by a an approximate 1 hour hold. The result was a opaque, 20% crystalline glass-ceramic whose composition was identified by x-ray diffraction (XRD) analysis as containing a lithium metasilicate crystalline phase. FIG. 3 is a SEM micrograph illustrating the Example 9 glass-ceramic Li-metasilicate crystal phase.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. A translucent or opaque glass-ceramic whose composition lies within the $SiO_2$—$R_2O_3$—$Li_2O/Na_2O$—$TiO_2$ system and comprises a silicate crystalline phase, and a composition, in weight percent on an oxide basis, of 40-80% $SiO_2$, 2-30% $Al_2O_3$, 2-10% $Li_2O$, 0-8% $TiO_2$, 0-3% $ZrO_2$, 0-2% $SnO_2$, 0-7% $B_2O_3$, 0-4% MgO, 0-12% ZnO, 0-8% BaO, 0-3% CaO, 0-6% SrO, 0-4% $K_2O$, from greater than 0% up to 3% $Na_2O$, 0-1.0% $Sb_2O_3$, 0-0.25% Ag, 0-0.25% $CeO2$, 0-0.01% Au, a molar ratio of $Li_2O+Na_2O/Al_2O_3+B_2O_3$ of greater than 0.8, wherein
 the glass-ceramic is made from a glass that exhibits a liquidus viscosity of greater than 75,000 poise, and
 a molar ratio of $Na_2O$ to $Li_2O$ increases from a surface to a bulk of the glass-ceramic,
 wherein $R_2$ comprises at least one of B and Al.

2. The glass-ceramic of claim 1 wherein the glass-ceramic is formed via down drawn glass process.

3. The glass-ceramic of claim 1 wherein a source of Li in the glass-ceramic structure is provided through an ion exchange process.

4. The glass-ceramic of claim 1 wherein the silicate crystal phase is comprised of a lithium aluminosilicate phase of β-spodumene and/or β-quartz solid solution.

5. The glass-ceramic of claim 1 wherein the silicate crystal phase is comprised of lithium metasilicate and/or lithium disilicate.

6. The glass-ceramic of claim 1 wherein the composition further includes the combination of $TiO_2+ZrO_2+SnO_2$ in an amount of at least 3.0 wt %.

7. The glass-ceramic of claim 6 wherein said composition comprises, in weight percent on an oxide basis, 55-70% $SiO_2$, 0-5% $B_2O_3$, 2.5-7% $Li_2O$, 0-3% $ZrO_2$, 0-1% $SnO_2$, 0-3% MgO, 0-6% ZnO, greater than 0 to 2% $Na_2O$, and 2-4.5% $TiO_2$.

8. The glass-ceramic of claim 1 wherein said composition further comprises a transition metal ion selected from the group consisting of $Co^{2+}$, $Cr^{3+}$, $Cu^{1+}$, $Sn^{4+}$, $Mn^{4+}$, $Sb^{3+}$, $Fe^{3+}$, $In^{3+}$, $Bi^{3+}$, $Ni^{2+}$, $V^{3+}$, and $Ta^{5+}$.

* * * * *